Patented Dec. 8, 1942

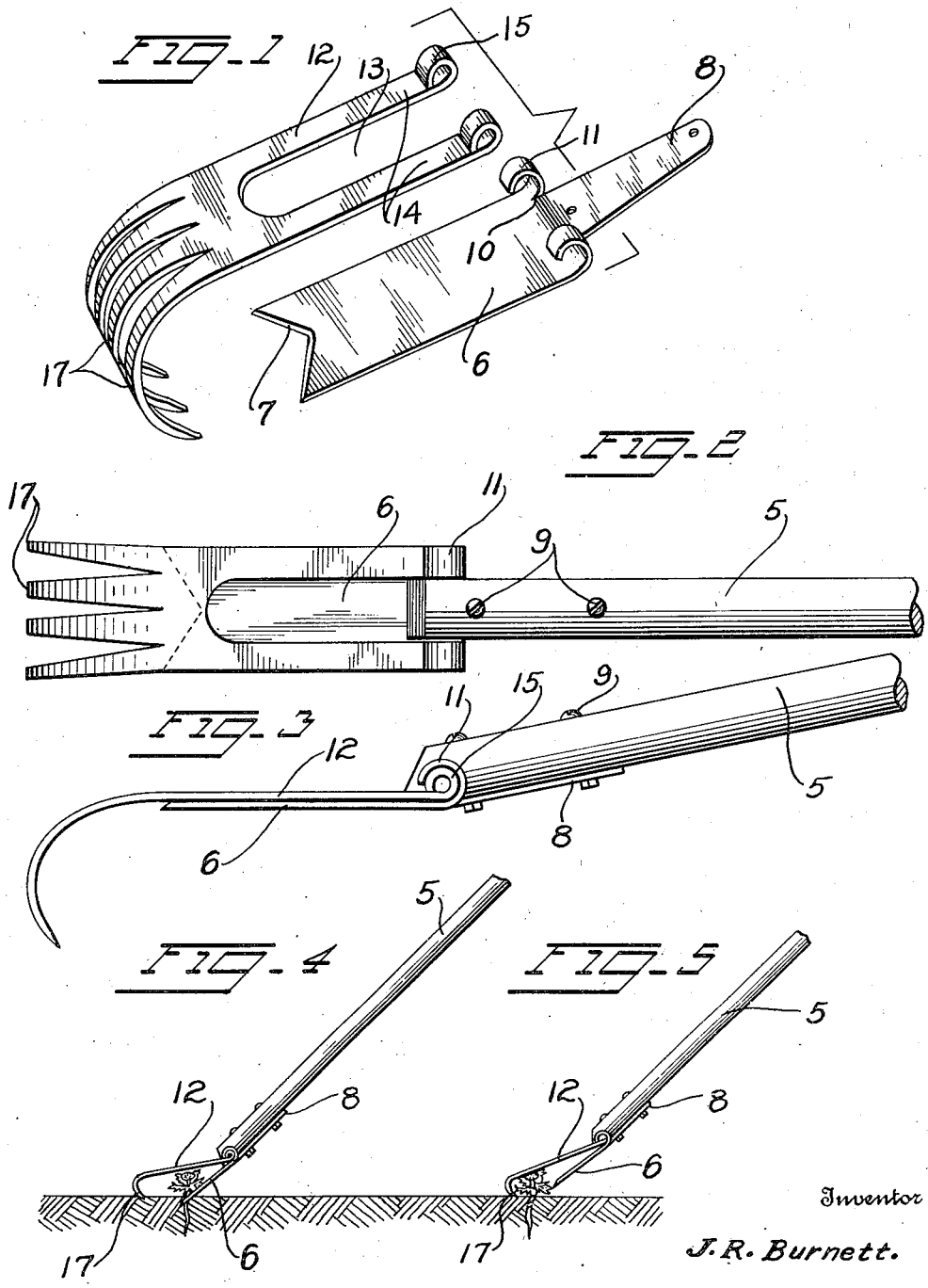

2,304,677

UNITED STATES PATENT OFFICE 2,304,677

DANDELION EXTRACTOR

Joseph R. Burnett, Columbus, Kans.

Application March 26, 1940, Serial No. 326,106

2 Claims. (Cl. 7—14.3)

This invention relates to weed cutters and has for its object to provide a comparatively simple and inexpensive device of this character by means of which the roots of dandelions, weeds and other obnoxious growths may be cut or severed and the tops of the plants removed from the ground at one operation of the device.

A further object of the invention is to provide a weed cutter comprising an operating handle having a cutting element rigidly secured thereto and on which is pivotally mounted a gathering element or rake, the parts being so arranged that, when downward pressure is exerted on the handle, the cutting element will penetrate the ground and sever the roots of a dandelion or other plant and when the cutting element is withdrawn from the ground, the gathering element will rake the surface of the ground at said plant and effectually remove the severed top thereof.

A further object is to provide the cutting and gathering elements with terminal loops or eyes fitting one within the other and on which the gathering element or rake is pivotally mounted for swinging movement, said loops or eyes being locked against lateral displacement by engagement with the adjacent end of the operating handle.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a perspective view of the cutting and gathering elements detached,

Figure 2 is a top plan view of the complete weed cutter,

Figure 3 is a side elevation,

Figure 4 is a side elevation showing the position of the parts when a downward pressure is exerted on the handle to cut or sever a dandelion, and Figure 5 is a similar view showing how the gathering element or rake is drawn over the surface of the ground to remove the severed top of a dandelion when the cutting element is withdrawn from the ground.

The improved weed cutter forming the subject-matter of the present invention comprises an operating handle 5 of any desired length and formed of wood or other suitable material. Disposed at the lower end of the handle 5 is a cutting element 6 preferably consisting of a flat strip of metal, the lower end of which is provided with a substantially V-shaped cutting edge 7 adapted to sever the roots of a dandelion or other plant when the cutter is forced into the ground. The rear end of the metal plate constituting the cutting element 6 is reduced to form a securing tang or shank 8 which bears flat against the adjacent portion of the handle 5 and is rigidly secured thereto by bolts or similar fastening devices 9. The metal on opposite sides of the tang or shank 8 is cut longitudinally at 10 and the metal at said cut portions bent or rolled forwardly to form transversely alined bearing loops 11.

Associated with the cutting element 6 is a gathering element or rake 12 also preferably formed of a flat strip of metal having its rear end bifurcated at 13 to form oppositely disposed arms 14, the terminals of which are bent or rolled to form eyes 15 adapted to fit within the loops 11 when the parts are assembled, as best shown in Figure 3 of the drawing. The free end of the plate forming the gathering member 12 is bent downwardly and rearwardly and provided with spaced teeth or tines 17 adapted to engage the severed top of a dandelion and remove said top from the ground after the dandelion has been severed by the cutting element 6.

It will here be noted that the lower end of the handle 5 fits within the bifurcated portion 13 and bears against the cutting element 6 between the nested portions 11 and 15 so that, when said elements are assembled, the side walls of the handle at the lower end thereof by engagement with the loops and eyes will effectually prevent lateral displacement of the parts and hold them in assembled position without the employment of pivot pins or similar fastening devices. By detaching the handle the eyes 15 may be slid laterally from within the loop 11 to permit ready separation of the parts when desired. It will further be noted that the eyes 15 are mounted to rotate within the loops 11 and form the pivot axis of the gathering member thereby to permit said gathering member or rake to swing laterally with respect to the cutting element 6.

In operation, the weed cutter is positioned over a dandelion in the manner shown in Figure 4 and a downward pressure exerted on the operating handle 5 which causes the knife 7 to enter the ground and sever the root of the dandelion. After the root of the dandelion has been cut, the cutting element 6 is withdrawn from the ground, and owing to the fact that the gathering element 12 is pivotally mounted with respect to the handle, said gathering element will rake the surface of the ground at said plant and effectually withdraw and remove the severed portion of the dandelion from the ground, as best shown in Figure 5 of the drawing. When the device is not in use, the gathering element or rake is swung laterally until it contacts with the cutting element 6 and in which position the parts occupy very little space, as best shown in Figure 3 of the drawing.

By reference to Figure 3 of the drawing, it will be noted that the shank 8 is slightly offset or inclined with respect to the horizontal plane of the cutting element 6 so that, when using the implement, said cutting element may be positioned some distance back of the plant and the angle or inclination of the cutting element with respect to the handle will insure severing the roots of the plant when downward pressure is exerted on said handle.

It will, of course, be understood that the weed cutters may be made in different sizes and shapes and constructed of any suitable material without departing from the spirit of the invention.

Having thus described the invention, what is claimed as new is:

1. A weed cutter comprising an operating handle, a stationary cutting element secured to the lower end of the handle, and a continuous one-piece gathering element appreciably longer than the cutting element and having one end thereof pivotally mounted on the cutting element adjacent said handle and its other end provided with terminal teeth normally extending beyond the front end of the cutting element and curved downwardly below said cutting element and rearwardly in the direction of and spaced from the front end of said cutting element.

2. A weed cutter comprising an operating handle, a cutting element rigidly secured to the handle and adapted when forced into the ground to sever the root of a growing plant, and a continuous one-piece gathering device pivotally connected with the cutting element and having its free end normally extended beyond the front end of the cutting element and provided with a plurality of teeth curved downwardly below said cutting element and rearwardly in the direction of and spaced from the front end of said cutting element, said teeth being movable over the surface of the ground to engage and remove the severed portion of a plant when the cutting element is withdrawn from the ground.

JOSEPH R. BURNETT.